C. BOUTHILLETTE.
WHEEL TREAD.
APPLICATION FILED APR. 22, 1922.

1,432,661. Patented Oct. 17, 1922.

Inventor
Charles Bouthillette
By William Clinton
Attorney

UNITED STATES PATENT OFFICE.

CHARLES BOUTHILLETTE, OF ACTON VALE, QUEBEC, CANADA.

WHEEL TREAD.

Application filed April 22, 1922. Serial No. 555,994.

*To all whom it may concern:*

Be it known that I, CHARLES BOUTHILLETTE, a subject of the King of Great Britain, residing at Acton Vale, Province of Quebec, Canada, have invented certain new and useful Improvements in Wheel Treads; and I do hereby declare that the following is a full, clear, and exact description of the invention, such as will enable others skilled in the art to which it appertains to make and use the same.

This invention relates to new and useful improvements in wheel treads, especially those applicable to automobile tires.

The primary object of the invention is to provide a tread device especially suitable for heavy driving, and adapted to cover the surface of the tire in order to protect the same, without interfering with the resiliency of the tire.

The invention further consists of a central longitudinal rib which prevents lateral slipping of the wheels when the brakes are applied.

A preferred embodiment of the invention is shown in the accompanying drawings in which.

Figure 1:
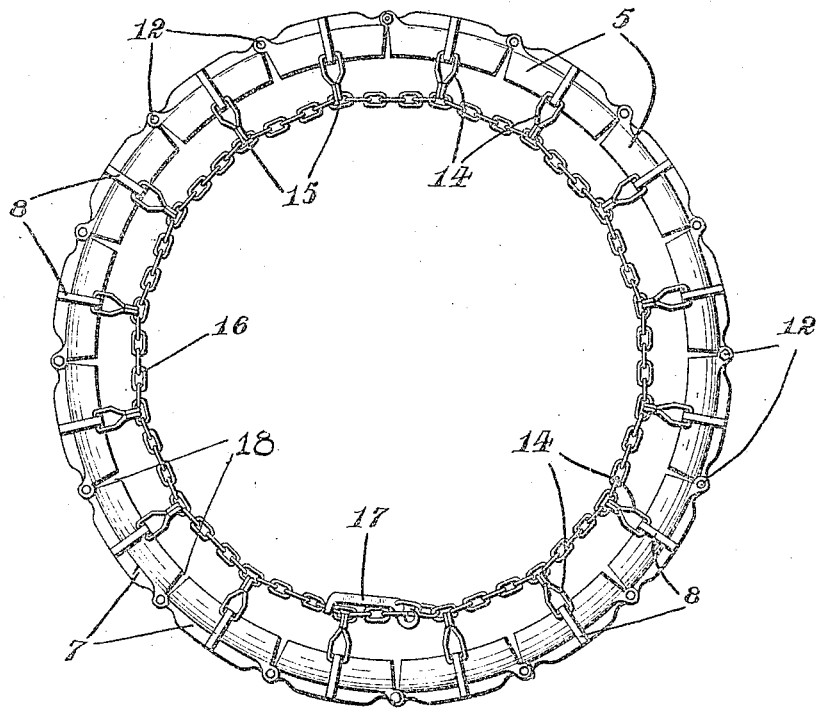
Figure 1 is a side elevation of the device.
Figure 2:
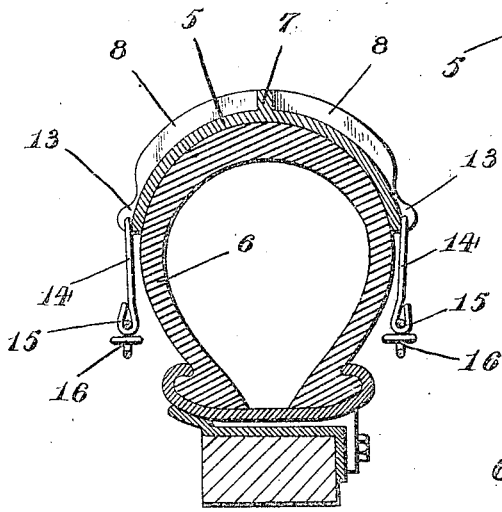
Figure 2 is a section of a tire having the device applied thereto.
Figure 3:
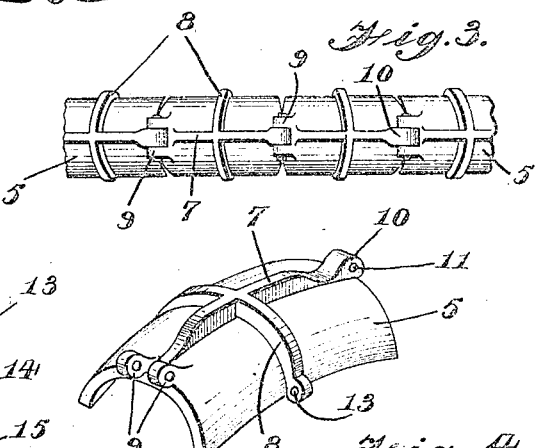
Figure 3 is a fragmentary plan view of the device.
Figure 4:
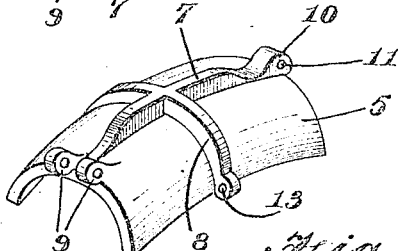
Figure 4 is a perspective view of one of the tread elements.

Referring to the drawings by reference characters, the device consists of a plurality of curved members 5 which are of shell formation and are adapted to fit over the tire 6 shown in Figure 2. Each tread member is provided with a central longitudinal rib 7, the purpose of which is to prevent sideward slipping of the wheel when the brakes are suddenly applied. One or more transverse ribs 8 are also formed on the outer surface of each member 5.

At one end of the longitudinal rib is formed a pair of apertured ears 9, while the opposite end is formed in the nature of an enlarged lug 10 having an aperture 11 therethrough. The dimensions of the ears and lugs are such that the lug 10 may be received between the ears 9 of the adjacent tread element. The adjacent elements are thus united by means of pins 12 passed through the apertures of the ears and lugs.

The ends of the transverse ribs 8 are apertured as at 13 and receive links 14. These links are hooked as at 15 to the usual side chains 16 at opposite sides of the tire. The side chains are tightened and their ends joined by means of a chain tightener 17.

It is to be noted that the shell formation of the tread elements 5 serves to protect the tire, while the pivotal connections and the angular spaces 18 between the elements make the device flexible and responsive to the resiliency of the tire.

While a specific embodiment of the invention has been illustrated and described, it is to be understood that various details of construction may be altered without departing from the scope of the invention as indicated by the accompanying claim.

Having thus fully described the invention, what I claim as new and desire to protect by Letters Patent is:—

In combination with a tire, a plurality of tread members each having a transverse and a central longitudinal rib, side chains at opposite sides of the tire, means at the ends of the longitudinal ribs for connecting the treads to one another, and means at the ends of the transverse ribs for connecting the treads to the side chains, said members being spaced from each other to allow pivotal movement therebetween.

In witness whereof I have hereunto set my hand.

CHARLES BOUTHILLETTE.

Witnesses:
  DONAT DESAUTELS,
  OMER DÉSAUTELS.